US005479024A

United States Patent [19]
Hillner et al.

[11] Patent Number: 5,479,024
[45] Date of Patent: Dec. 26, 1995

[54] METHOD AND APPARATUS FOR PERFORMING NEAR-FIELD OPTICAL MICROSCOPY

[75] Inventors: Paul E. Hillner, Berlin, Germany; Manfred Radmacher; Paul K. Hansma, both of Santa Barbara, Calif.

[73] Assignee: The Regents of the University of California, Oakland, Calif.

[21] Appl. No.: 288,260

[22] Filed: Aug. 11, 1994

[51] Int. Cl.$^6$ ............................ G01N 21/64; G02B 21/00
[52] U.S. Cl. .................................. 250/458.1; 250/459.1; 356/376; 359/368
[58] Field of Search ........................... 250/458.1, 459.1, 250/461.1, 461.2, 216; 359/368; 356/376, 317, 318

[56] References Cited

U.S. PATENT DOCUMENTS

| | | | |
|---|---|---|---|
| 4,604,520 | 8/1986 | Pohl | 250/216 |
| 4,947,034 | 8/1990 | Wickramasinghe et al. | 250/216 |
| 5,105,305 | 4/1992 | Betzig et al. | 250/458.1 |
| 5,288,996 | 2/1994 | Betzig et al. | 359/368 |
| 5,356,218 | 10/1994 | Hopson et al. | 356/376 |

OTHER PUBLICATIONS

Scanning Nearfield Optical Microcope Using Microfabricated Probes, M. Radmacher, P. E. Hillner, P. K. Hansma, Dept. of Physics, Univ. of Calif., Santa Barbara, Calif. 93106 (Undated).

Rev. Scl. Instrum., vol. 62, No. 11, Nov. 1991, p. 2637.

Possible Observation of Local Plasmon Modes Excited by Electrons Tunneling Through Junctions, Arnold Adams, J. C. Wyss, and P. K. Hansma, Phys. Review Letters, 42(14), 1979, pp. 912–915.

Surface Plasmon Resonances in Gas–Evaporated Ag Small Particles Effects of Aggregation, S. Hayashi, R. Koga, M. Ohtuji and K. Yamamoto, Solid State Communications, 76(8), pp. 1067–1077, 1990, Pergamon Press, Great Britain.

A Study of Fluorescent Intensity Emitted by Eu$^3$+ Ions Near Dielectric Interfaces, Q. Q. Shu, P. K. Hansma, P. Das and H. Metiu, Journal of Luminescence 40&41 (1988) 745–746, North–Holland Amsterdam.

Near–Field Optical Measurement of the Surface Plasmon Field, O. Marti, H. Bielefeldt, B. Hecht, S. Herminghaus, P. Leiderer and J. Mlynek, Optics Communication 96 (1993) pp. 225–228 North–Holland.

Optical Stethoscopy: Image Recording with Resolution $\gamma/20$, D. W. Pohl, W. Denk and M. Lanz, Appl. Phys. Letters, 44(7), Apr. 1994, pp. 651–653.

Intermolecular and Surface Forces, Second Edition, Jacob N. Israelachvili, Academic Press. San Diego, Calif., 1992, pp. 176–193.

(List continued on next page.)

*Primary Examiner*—Carolyn E. Fields
*Attorney, Agent, or Firm*—Oblon, Spivak, McClelland, Maier & Neustadt

[57] ABSTRACT

A near-field optical microscope and method of microscopy in which a probe including a flexible cantilever having a sharp tip is positioned in proximity to a sample. In one embodiment, a region of the sample is irradiated with light, and one or more portions of this region are caused to fluoresce. A quenching element is provided at the tip of the probe to quench the fluorescence of these portions within the region. The amount of quenching is determined while the sample is scanned to produce a high resolution image of the irradiated region of the sample. In another embodiment, the fluorescence imparted to one or more portions of the irradiated region is enhanced by the interaction of an optically active element disposed at the tip portion of the cantilever probe which provides for sharper images with greater signal-to-noise ratios. The near-field optical microscopes according to the present invention can also be used to measure the reflection/transmission or absorption characteristics from a sample region within a distance of one wavelength of light away from the sample surface. The microscopes also include means for producing a relative scanning motion between the sample and the probe such as by raster scanner or circular scanning, for example.

22 Claims, 8 Drawing Sheets

OTHER PUBLICATIONS

The Effects of the Interaction Between Resonance in the Electromagnetic Response of a Sphere–Plane Structure; Applications to Surface Enhanced Spectroscopy, Surface Science 124, 1983, pp. 506–528, North Holland Pub.

The Interaction Between Electromagnetic Resonances and its Role in Spectroscopic Studies of Molecules Adsorbed on Colloidal Particles or Metal Spheres, P. K. Aravind, Abraham Nitzan, Horia Metiu, Surface Science, 110, 1981, pp. 189–204, North Holland Pub.

Apertureless Near–Field Optical Microscope by F. Zenhausern, M. O. O'Boyle and H. K. Wickramasinghe, IBM T. J. Watson Research Center, P.O. Box 218, Yorktown Heights, New York, N.Y. 10598 (Undated).

Fluorescence and Phosphorescence Spectroscopy: Physicochemical Principles and Practice by Stephen G. Schulman, Pergamon Press, Oxford, pp. 65–67.

METHOD AND APPARATUS FOR PERFORMING NEAR-FIELD OPTICAL MICROSCOPY

This invention was made in part with the support of the National Science Foundation Division of Materials Research under grant DMR 92-21781. The U.S. Government has certain rights in the invention.

BACKGROUND OF THE INVENTION

1. Field of the Invention

The present invention relates to near-field optical microscopy in which a sample undergoing study is irradiated with light and the reflection/transmission or absorption characteristics of the sample are analyzed so that an image of the sample is generated. The invention also relates to near-field optical (NFO) microscopes in which a near-field optical probe is used to produce changes in the reflection, transmission or absorption characteristics of a sample under study.

2. Discussion of the Related Art

Optical microscopy is one of the most widespread experimental techniques in science because of its ease of use and its well established theoretical background, which makes image interpretation relatively straight forward. The major limitation of optical microscopy is on the resolution of the produced images, which will generally be equal to the order of wavelength of light which is used. This limitation remains despite the fact that under certain circumstances distances or thicknesses can be measured with much higher accuracy. In these cases, the sample geometry is restricted or certain predetermined information about the sample is necessary in order to interpret the images. Confocal microscopy and video enhanced microscopy can increase lateral and vertical resolution by typically a factor of two for some types of samples (see Pluta, M. Advanced Light Microscopy; Elesevier: Amsterdam, 1989; volume 2).

An improvement in resolution is possible by using a near-field optical microscope. The basic idea for this type of microscope originated in Ireland in the beginning of the 20th Century and was demonstrated using microwaves in the 1970's. The first application to optical light was reported recently in Pohl, D. W.; Denk, W.; Lanz, M. Applied Physics Letters, 1984, volume 44, pages 651–653. In near-field optical microscopy, a sharp tip which is usually a sharpened glass fiber, is used as a light source and raster scanned above the surface. Using the specially sharp fibers, a resolution of about 12 nanometers can be achieved. The sharpening of the fibers is usually done by pulling them in a very special way which results in a very thin fiber. They are very fragile, yet need to be scanned very close to the samples. Care needs to be taken to prevent the fiber from touching the sample and breaking. One solution to this problem involves looking at the lateral bending of the fiber and using this signal as the input to a distance control circuit. Another problem with using fibers is their low efficiency. Because of their small opening angle, most of the light is absorbed by the metal coated fiber walls so that only a small fraction of the light passes through the tip of the fiber (signal levels of up to 50 nW have been reported). Despite these problems, the benefit of the increased resolution has justified the increased amount of work in this area and has yielded impressive images. Another approach to the low resolution problem has been to make specially designed microfabricated tips for scanning near-field optical microscopy similar to those designed for scanning ion conductance microscopy. These tips are not, however, available commercially and the microfabrication process is too complex to make it practical for most researchers.

Near-field scanning microscopy has been performed in the prior art mainly using optical fibers which have been tapered to a sharp tip so as to project light onto the sample in order to measure light reflected by the sample and/or transmitted through the sample and projected onto a detector device for viewing and/or analysis by an operator. However, the use of optical fibers for use in near-field optical microscopy has other disadvantages in that these optical fibers are subject to easy breakage, they can not be fabricated with current micro-machining technology and the fibers can be destructive to the sample if they come in contact with the sample, such as, by scraping the sample. Therefore, a complicated mechanism for preventing the contact between the optical fibers and the sample has been necessary. The use of optical fibers has another drawback in that it is difficult to taper the optical fibers in order to create an aperture small enough for performing high resolution imaging.

Figure 1:
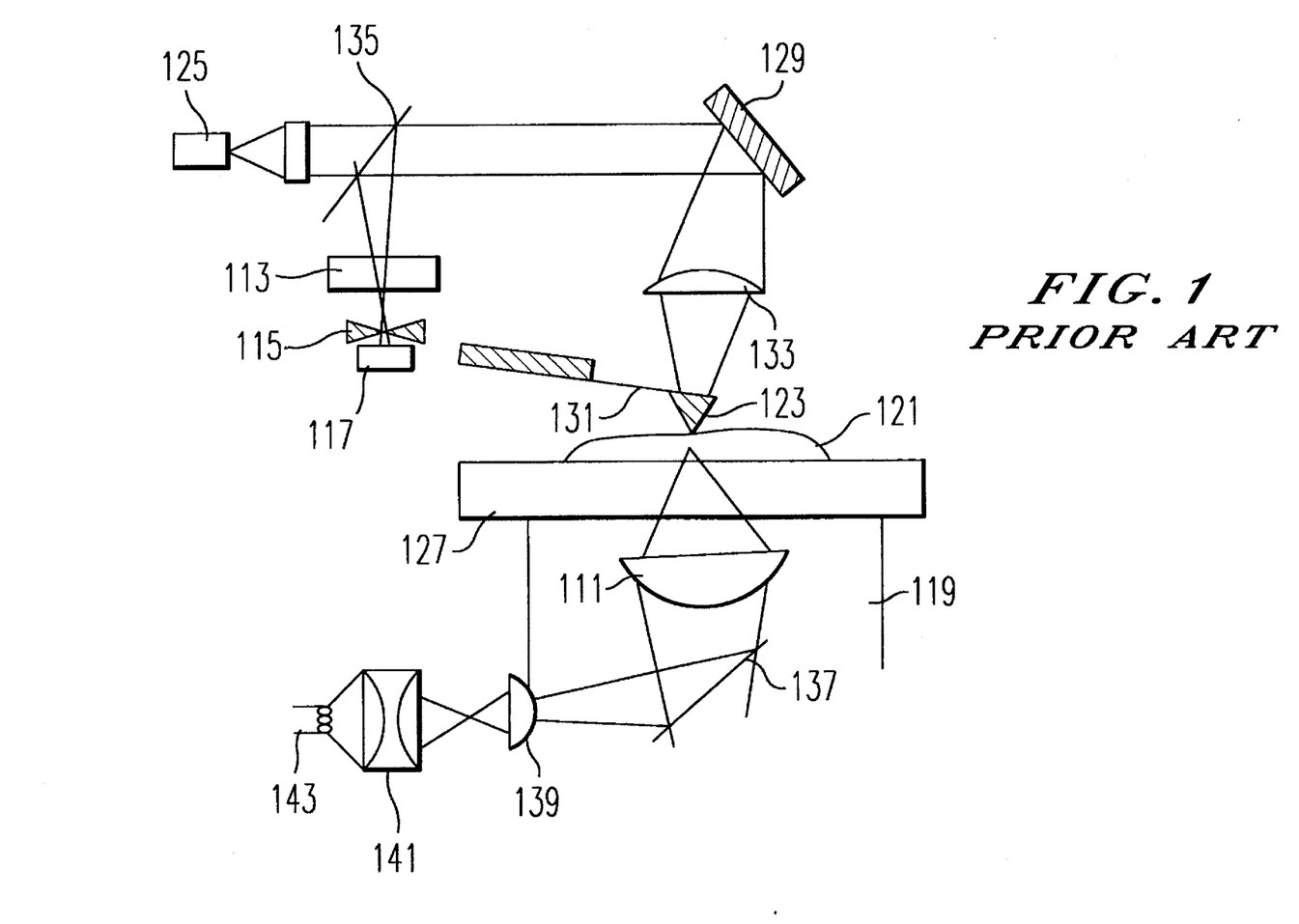
FIG. 1 illustrates a conventional near-field scanning microscope.

In order to overcome such disadvantages associated with optical fibers, there has been proposed a method of performing near-field optical microscopy using a cantilever having a sharp tip formed of silicon nitride (see van Hulst, et al, "Operation Of a Scanning Near Field Optical Microscope in Reflection in Combination With a Scanning Force Microscope", SPIE Vol. 1639, pp. 36–43, 1992). In this conventional device as shown in FIG. 1, a micro-fabricated SiN cantilever 131 having an integrated pyramidal tip 123 is fixed at an angle to the upper surface of a sample 121. The tip is coated with an opaque material so that only light focused on the aperture of the tip passes through to the sample surface. The sample is placed on a mount 127 which is movable with respect to the fixed cantilever via a piezoelectric tube scanner 119. As can be seen from FIG. 1, light from a source 143, such as a mercury discharge lamp, passes through lenses 141 and 139, and is reflected by a dichroic mirror 137 and focused by objective lens 111 onto the back surface of the sample to illuminate the sample portion under study so that it can be viewed by an observer. Light from a laser source 125 is projected through a dichroic mirror 135 and is deflected by reflector 129 and focused by lens 133 into the back portion of the silicon nitride tip of the cantilever 131. Light which passes through the opening of the tip 123 is reflected off the sample back through the silicon nitride tip, reflected by elements 129 and 135, passed through a filter 113 and diaphragm 115 and is then received by a detector 117. These detected reflections are then used to generate an image of the sample which has been scanned across its entire surface.

However, the foregoing apparatus has an important disadvantage in that the light which is projected onto the back surface of the cantilever tip is also reflected back to the detector device along with the light which passes through the tip of the cantilever, strikes the surface of the sample and is then reflected back through the tip to the detector device. Because of this, it is difficult to distinguish the small changes due to the light which is reflected off the sample since there is a significant amount of reflected light which constitutes "noise" generated by the reflections off the back surface of the cantilever tip.

Another known method of performing near-field optical microscopy relies upon local modification of an evanescent field which is an extremely thin (of micron proportions) region of electromagnetic energy which exists adjacent to a back surface of a prism where a beam of light has been projected through a front surface of the prism and this light beam is totally internally reflected off the back surface of the prism so that no visible light is emitted through the back surface of the prism into the far field. The introduction of a sharp probe tip into this evanescent field, however, will cause an induction of some of the electromagnetic energy to be emitted from the back surface of the prism. This will result in the emission of light into the far field. This light which is emitted from the back surface of the prism will be modified by the different properties of the sample which is disposed on the back surface of the prism where the back surface serves as a mount for the sample and the probe tip follows the sample topography. An image of the sample can be obtained by detecting the changes in light emitted through the sample into the far field as the probe tip follows the surface topography of the sample. However, the main disadvantage of using evanescent field modification is, as noted above, that these fields extend only a very small distance above the back surface of the prism. Therefore, if it is desired to view an object such as a cell, for example, which is of relatively thick dimensions, the foregoing prior art devices will not provide satisfactory results, since the evanescent field would not extend completely through the relatively thick cell under study so as to be able to be locally modified by the probe tip.

Another known method of performing near-field optical microscopy using a probe is disclosed in U.S. Pat. No. 5,105,305 to Betzig et al. According to this method and apparatus, a microscope is provided with a probe having a narrow aperture which includes a plurality of minute particles which are impregnated with fluorescent dye so that upon irradiation of these particles with light, the particles emit fluorescent light to be projected onto the sample. Then, by moving the probe aperture into close proximity to the sample surface, the fluorescence emitted from the probe aperture will be quenched due to dipole-dipole interactions between the particles and the sample surface. The Betzig et al method and apparatus also provides transmission and reflection modes of scanning using the fluorescent light emitted from the probe tip in order to generate images of the sample surface or composition of the sample. Such a microscope has a main disadvantage, however, that the probe apparatus is not finely controlled with respect to its positioning in close proximity to the sample surface which could thereby lead to the possibility of a large contact force with the sample surface which may damage the sample.

Another known probe for performing near-field optical microscopy is disclosed by Pohl in U.S. Pat. No. 4,604,520. Such a probe is formed by providing a transparent tip having a metal coating around the outside walls thereof in order to provide a small opening for performing the optical scanning in a transmission or reflection mode. However, the Pohl apparatus has the same disadvantages described above with respect to Betzig et al, i.e., there will be the possibility of causing damage to the sample if the probe tip comes too close to the sample surface.

SUMMARY OF THE INVENTION

Accordingly, one object of the present invention is to provide an apparatus for performing near-field optical microscopy which overcomes the foregoing disadvantages of the prior art.

Another object of the present invention is to provide a near-field optical microscope for scanning an object in order to produce a high resolution map of a fluorescing characteristic of the sample under study.

Another object of the present invention is to provide a method and apparatus for performing near-field optical microscopy which avoids the disadvantages associated with using optical fibers and which utilizes micro-machined cantilevers for determining the locations of proteins or other cell structures within a sample based on the fluorescence characteristics of these structures.

A still further object according to the present invention is to provide a method and apparatus for performing near-field optical microscopy which utilizes a micro-machined cantilever member having a sharp tip which enables local modifications of the optical properties of a sample exposed to light from a light source in order thereby to generate an image of the sample under study.

These and other objects are achieved according to the present invention by providing a novel apparatus for performing near-field optical microscopy on a sample supported on a mount, including a light source for irradiating the sample with light to cause a portion of the sample to fluoresce; a probe having a tip provided with an optically active element in order to locally discharge a portion of the energy imparted to the sample by the light source; and a detecting means for detecting changes in the optical properties of the sample due to movement of the optically active element into close proximity to the sample.

In a preferred embodiment, the apparatus of the invention includes means for producing relative movement between the optically active element of the probe tip and the sample, and the detecting means detects changes in the optical properties of the sample at a plurality of locations on the sample during the relative movement between the sample and the optically active element of the probe tip.

In another embodiment, the fluorescence imparted to one or more portions of the irradiated region is enhanced by the interaction of an optically active element disposed at the tip portion of the cantilever probe, thereby to produce sharper images with greater signal-to-noise ratios. The apparatus according to the present invention is also used to measure the reflection, transmission or absorption characteristics from a sample region within a distance of one wavelength of light away from the sample surface. The apparatus of the present invention also includes means for producing a relative scanning motion between the sample and the probe such as by raster scanner or circular scanning, for example.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The present invention involves the use of near-field optical microscopes which use tips that are normally employed in the field of atomic force microscopy (AFM). These tips are commercially available (Digital Instruments, Santa Barbara, Calif.) and are microfabricated hollow pyramids made of silicon nitride with a typical height and width of four microns attached to long, soft cantilevers. The opening angle is typically 20° and the radius of curvature at the tip can be as low as 20 nanometers. These tips can be scanned while in contact with a sample because they can easily bend and are thus resistant to breakage. In addition, an optical lever detection system, similar to the ones used in atomic force microscopy, can be used to minimize loading forces in the same manner as an atomic force microscope.

Figure 2:
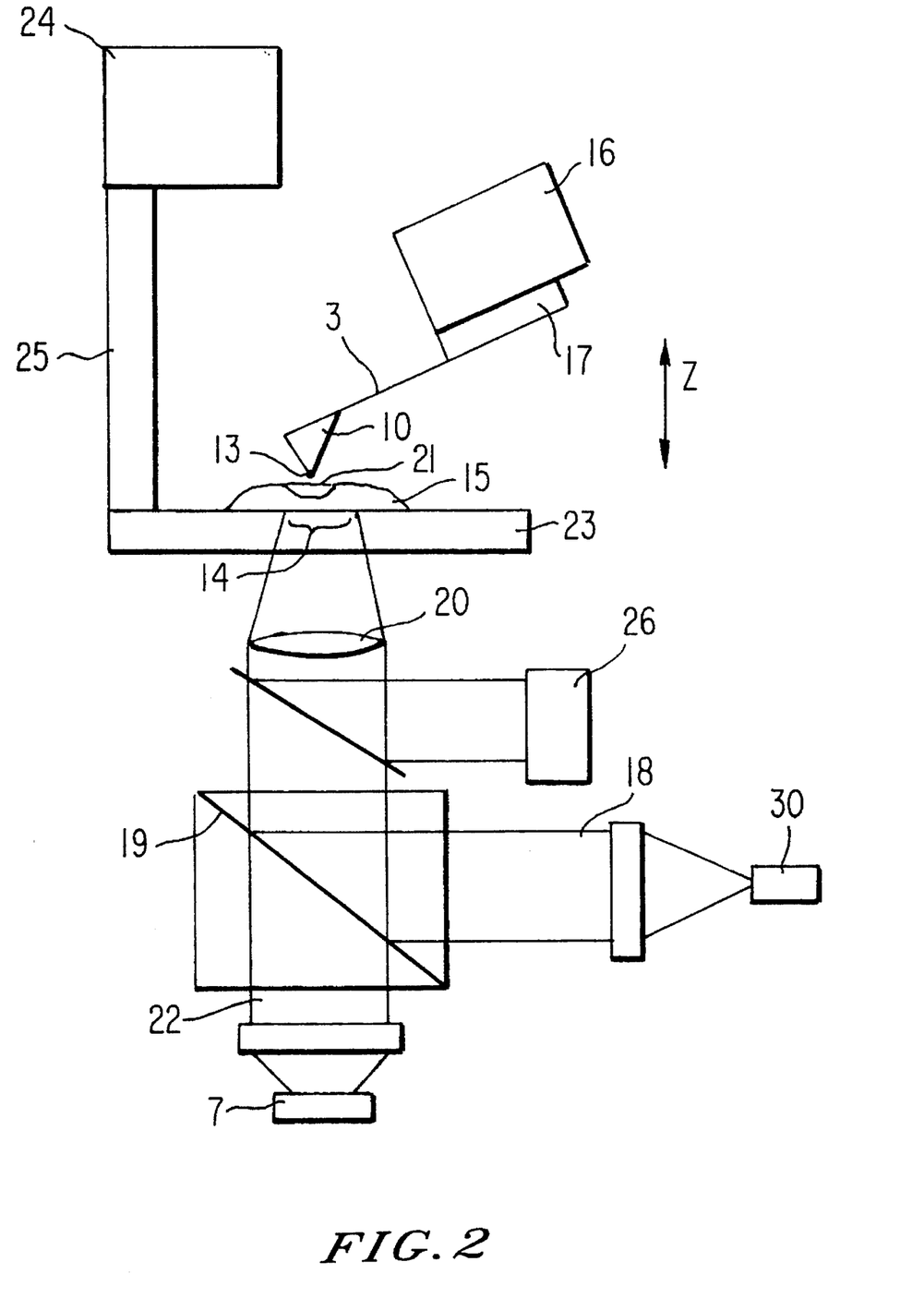
FIG. 2 illustrates a first embodiment according to the present invention.

Referring now to the drawings, wherein like numerals designate identical or corresponding parts throughout, and more particularly to FIG. 2 thereof, there is shown a side view of the apparatus according to one embodiment of the present invention. As shown in FIG. 2, the apparatus includes a cantilever 3 having a tip 10 which includes, at a distal end portion thereof, an optically active element 13 which can be used, for example, to quench fluorescent light emitted from a portion of the sample 15 upon irradiation of the sample with light energy, as will be explained in detail later. Attached to an opposite end of the cantilever 3 is a first translator device 16 coupled to the cantilever, preferably through a chip 17 for ease of handling. The first translator device 16 is used in one embodiment of the invention to perform oscillation of the tip 10 in the z direction, as indicated by the arrow shown in FIG. 2, as will be described in detail below.

The sample under study is supported by a transparent mount 23 which is connected at one end thereof to a second translator device 24 through a boom 25. The second translator 24 provides the scanning movement of the sample with respect to the stationary probe tip. Alternatively, the probe is scanned with respect to a stationary sample. Although two translators 16 and 24 are shown, a single piezo tube scanner or any other type of scanning device may be used for producing x, y raster scanning, circular scanning and z direction movement, i.e., the sample can be moved up and down rather than the probe tip, if desired.

Below the mount 23 is an optical lens 20 for focusing a light beam 18 from a light source 30 which is reflected by a partially silvered or dichroic mirror 19 and is focused onto region 14 from the back surface of the sample in order to impart energy thereto and thus cause the sample to fluoresce. The region 14 is normally the entire field of view to be imaged. It can, however, be expanded to be the entire sample, but this will result in a detection light having a reduced intensity. Alternatively, the region 14 can be narrowed to a fraction of the field of view near the optically active element 13 when higher intensity is required. An objective 26 enables the operator to view the sample while the probe is being positioned into close proximity to the sample surface. Light source 30 is a mercury arc discharge lamp or a laser, for example. The light source 30 is generally positioned on the opposite side of the sample from the cantilever 3 as shown in FIG. 2. It can, however, be positioned on the same side if the tip 10 is transparent, i.e., the front surface of the sample 15 is irradiated by projecting the light beam through the transparent tip and onto the sample surface.

Irradiation of the sample imparts energy to the molecules of the sample. This energy is discharged by means of the release of one or more photons of fluorescent light 22 which is detected by an optical detector 7. The light used for irradiating the sample has a wavelength which is typically less than 500 nm, while the fluorescent light will generally have a wavelength greater than 500 nm such as, for example, 600 nm or higher. These different wavelengths facilitate the detection of changes in the amount of fluorescence by enabling the filtering out of the light from the irradiation source 30, thereby leaving only the fluorescent light for detection. In a preferred embodiment, the optically active element 13 is silicon, gallium arsenide, iridium, and iridium-platinum alloy, or any other suitable conductive material.

In FIG. 2, the quenching of the fluorescent light emitted by portion 21 will occur when the optically active element 13 attached to the apex of probe tip 10 comes into close proximity with the fluorescing portion 21. When this occurs, the electromagnetic energy imparted to portion 21 will be absorbed by the optically active element which is slightly heated in the process, thereby quenching the energy of portion 21 and preventing fluorescent light from being further emitted therefrom. This will cause a dark portion to exist where portion 21 was previously fluorescing. This change in the amount of fluorescence output by portion 21 is detected by a detector 7, which can be a photomultiplier tube (PMT) and a lock-in amplifier. For portions 21 of the irradiated region 14 which fluoresce more brightly than other portions 21, there will be larger changes in the overall light received from the irradiated region 14 by the detector 7. The brighter the fluorescence, the greater the amount of fluorescent light which will be quenched when the tip comes close to the sample surface. Thus, by simply analyzing how much the fluorescent light output varies upon introducing the probe tip into close proximity to the fluorescing region 21 as a function of where the tip is over the surface of the sample, the apparatus of the present invention provides a microscopic mapping of the fluorescing characteristics of the sample.

In the above embodiment, in order to maintain the probe tip within sufficient proximity to the sample surface in order to perform the quenching of fluorescing regions, the probe tip is first moved into position while an operator monitors the tip position by viewing the tip through the microscope objective 26 so as to contact the sample surface and the tip is then raised slightly a controlled distance above the sample surface. The probe tip is thus maintained a slight distance (on the order of nanometers) from the surface of the sample at certain portions of the sample surface while at the same time coming into contact with other portions of the sample surface depending upon the topography of the sample surface, i.e., there will be hills and valleys due to the irregular topography of the sample surface. In an alternative embodiment, the tip is set so as to contact the sample surface and is permitted to passively follow the topography of the sample due to the resiliency of the flexible cantilever. In this case, since the cantilever is flexible, the probe tip will move up and down along with the topography of the surface of the sample while maintaining contact therewith without damage to the sample, as will be described in more detail later.

In another embodiment, quenching is performed by oscillating the tip up and down at, for example, several KHz at the surface of the sample and then monitoring the corresponding variation in the light signal. In this case, if the probe tip is over a portion of the sample which is brightly fluorescing, a large signal at the cantilever oscillation frequency will be detected since a large light signal will be quenched each time the cantilever comes close enough to the sample to quench the light. If, on the other hand, the probe tip is over a region that is not fluorescing, there will be no output signal at all since there will be no light from that region of the sample and therefore nothing to quench. In this manner, by using an optical detector which is tuned to detect the frequency of the output light so as to monitor how great the received AC signal is at the frequency of cantilever oscillation as a function of the position, an image of the fluorescence of the surface is generated.

Figure 3:
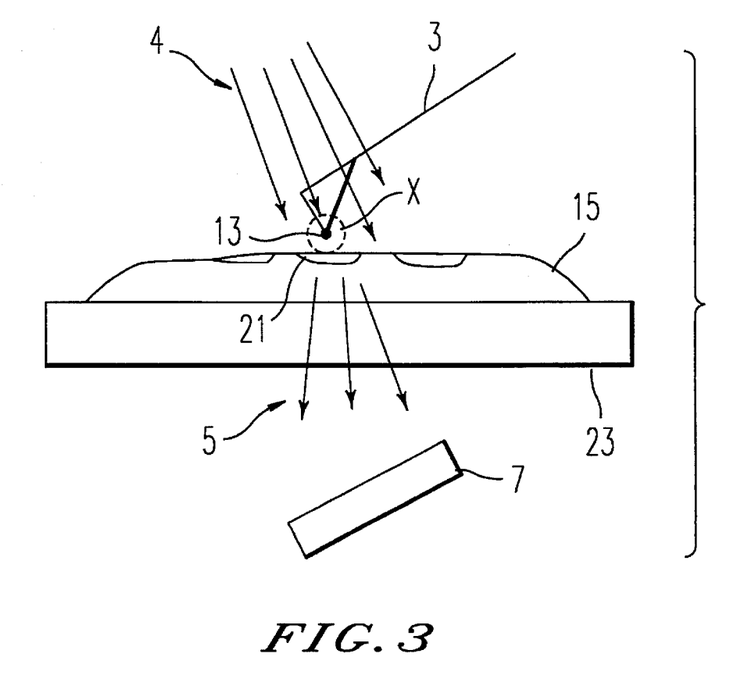
FIG. 3 illustrates an alternative embodiment according to the present invention whereby the fluorescence of different portions of the sample is enhanced by the interaction of electromagnetic energy with a conductive particle included at the tip portion of the cantilevered probe.

As another embodiment according to the present invention, the fluorescence quenching described above is replaced with a fluorescence enhancement technique, as illustrated in FIG. 3. This is achieved by substituting the quenching element with an optically active element which serves to enhance the fluorescence of the different portions of the irradiated region 14. Silver or gold particles are preferably used as the material for the optically active element here, as such metals have been shown to enhance electric fields in their vicinity and thus enhance fluorescence. See, for example, Aravind et al, "The Interaction Between Electromagnetic Resonances And Its Role In Spectroscopic Studies Of Molecules Adsorbed On Colloidal Particles Or Metal Spheres" Surface Science, Vol. 110 (1981), pp. 189–204. The wavelength of light is selected so as to cause the greatest plasmon resonance of the particle, and therefore the greatest fluorescence enhancement. While this wavelength will depend upon the size of the particle, it is typically in the visible wavelength range for particles in the size range of 10–100 nanometers.

As shown schematically in FIG. 3, fluorescing portion 21 is excited by incoming electromagnetic radiation 4 and the fluorescence generated is received by detector 7. The incident electromagnetic radiation 4 and the outgoing light 5 is imparted or detected from any direction desired. The optically active element 13, in this case a small metal particle, coating or element, is provided at the tip portion of the cantilever 3 so as to be within the electromagnetic field imparted to the sample, and the interaction of the electromagnetic radiation with the optically active element 13 causes a greatly increased electromagnetic field in the vicinity of the conducting particle 13 due to the plasmon resonance phenomenon. In particular, as described in Adams et al, "Possible Observation of Local Plasmon Modes Excited by Electrons Tunneling through Junctions", Physical Review Letters, April, 1979 and Hayashi et al, "Surface Plasmon Resonances in Gas-Evaporated Ag Small Particles: Effects of Aggregation" Solid State Communications, Vol. 76 No. 8, pp. 1067–1070, 1990, electromagnetic fields in the vicinity of a small metal particle can be enhanced by surface plasmon modes in the particle. The enhanced electromagnetic fields enhance Raman scattering, and also enhance light emission from a tunnel junction. According to the present invention, the enhanced fields are used as local probes for near field optical microscopy. The enhanced fields are used to locally, i.e., in the near-field region of the particle, excite fluorescence or increase the excitement of the fluorescence. The optically active particle 13 is used to create the locally enhanced field. Such use is enabled because the enhanced fields decay away from the particle with a decay length shorter than the wavelength of light. Thus the enhanced fields exist only in the immediate vicinity of the particle and changes in the optical properties of the sample which are stimulated by these fields are localized within a region smaller than a wavelength of light, i.e., smaller than the decay length. The enhanced fields are produced by first analyzing spectra of the particles to be used and determining the optimum wavelength light for exciting the particles by looking for the wavelength which results in the greatest scattering of the incident light. Such scattering is due to the excitation of the plasmons and their subsequent radiation decay in many directions. This phenomenon has been described in Aravind et al, "The Effects of the Interaction Between Resonances in the Electromagnetic Response of a Sphere-Plane Structure; Applications To Surface Enhanced Spectroscopy", Surface Science, Vol. 124 (1983), pp. 506–528. The optimum wavelength is then used to effect the plasmon resonance of the particle during imaging. The enhanced electromagnetic fields further excite the fluorescing portion 21 which has been excited by the initial electromagnetic radiation 4 so that it will fluoresce even more brightly in the vicinity of the optically active element. In this manner, the optically active element 13 functions to provide a greater signal-to-noise ratio for the outgoing light 5 which is received by detector 7. FIG. 3 shows an enhanced electromagnetic field X in a region surrounding the optically active element 13. The enhancement of the electromagnetic field can be up to 100 times that which exists at the sample surface due to the illumination light 4. The signal-to-noise ratio for the embodiment shown in FIG. 3 will be B/A where A is equal to the total amount of fluorescent light detected by detector 7 due to the emitted light from portion 21, and B is the maximum amount of fluorescent light which can be quenched in region X, i.e., B is the amount of fluorescence from region X being collected. Also, if in the enhancement design, with average enhancement C, the enhanced fluorescence detected from region X is BC and the S/N ratio becomes BC/A which is C times better in terms of enhancement. The present invention generates a map of the fluorescence excitability of the sample having a resolution substantially equal to the size of region X shown in FIG. 3, i.e., a near-field optical microscope. The optically active element 13 acts like a small antenna scanning over the surface of the sample and a microscopy is performed by looking at the light output intensity as a function of the location of this small antenna. Conventional near-field optical microscopes include a small aperture at the tip of the probe which is smaller than an optical wavelength and the fields at the tip can be calculated. It should also be noted that the largest output signal is not recorded when the probe is directly above the molecule. Rather, a complicated dipole-dipole interaction between the probe tip and the fluorophor is created which makes each fluorophore produce two irregular patches of high intensity. This will also occur for an enhancement near-field optical microscope using such an optically active element 13. The excitability of each fluorophore depends upon the orientation and distance from the near-field optical probe. For isolated particles, the fluorophore itself "images" the electric field distribution of the probe because the fluorophores are significantly smaller than the conventional near-field optical probes. It is also possible in theory to reduce the probe down to another fluorophore and look at "resonance energy transfer" (RET) between the fluorophores.

Figure 4:
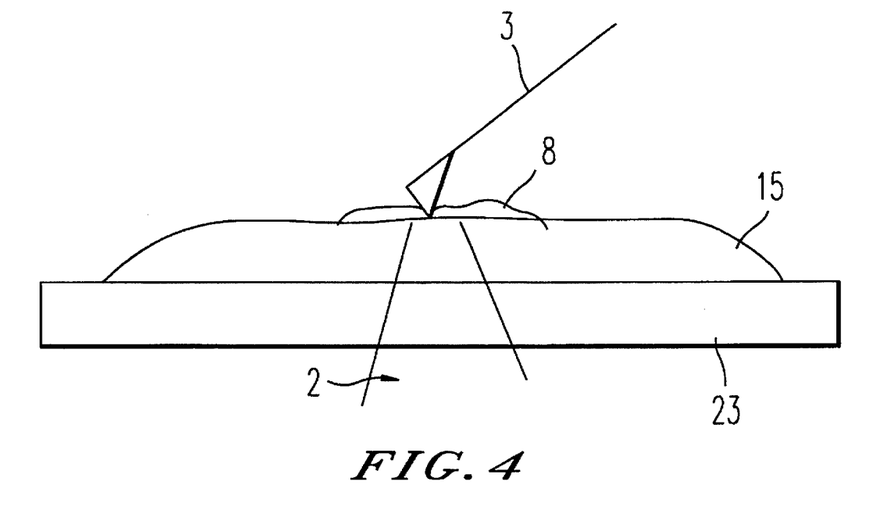
FIG. 4 illustrates a further embodiment according to the present invention which illustrates a reverse-field scanning technique.

As a further embodiment according to the present invention, there is illustrated in FIG. 4 a reverse-field near-field microscope which operates in essentially the opposite manner from that of the embodiment of FIG. 2. For example, the surface of the sample 15 is coated with a layer 8 of fluorescence quenching material such as, for example, a liquid or gel doped with conducting particles, such as a ferro-fluid. The layer 8 is locally displaced by a nonconducting element located at the tip portion of cantilever 3 to permit fluorescence in a small region in close proximity to the tip of the probe. The embodiment of FIG. 4 results in a greatly reduced background signal as fluorescence will only be detected when the nonconducting tip displaces the quenching liquid or gel away from the surface of sample 15. In this embodiment, when the ferro-fluid is displaced by the cantilever tip, the ferro-fluid will not quench the fluorescence as strongly and therefore brighter fluorescence will be seen. When the ferro-fluid is displaced approximately 10 or 20 nanometers radially from a sample region, quenching will be reduced by an amount equal to approximately two orders of magnitude. Also, in the case where the sample 15 is opaque, light 2 from the light source will be irradiated from the front surface of the sample from a location above the transparent cantilever tip.

The fluorescence quenching or enhancement techniques described above may be used in biological applications, where it is desired to evaluate a cell with specific proteins of interest located on the surface of the cell. These specific proteins are tagged with materials which will fluoresce more brightly than other portions of the irradiated sample in order to make those portions of the cell glow brightly in the regions where such tagged proteins are present. These embodiments are illustrated in FIGS. 3 and 4. Here, the microscopes measure a map of the fluorescence excitability of the sample and because the sample is constructed such that the proteins are tagged with fluorophores which will create bright regions in the fluorescence excitability map, the positions of the proteins will be recorded as those bright regions in the image.

Another application of the invention is for use in DNA mapping in order to provide high resolution images of DNA sequences of the individual nucleic acids which constitute the DNA strands. In such an application, different dyes specific to certain nucleic acids are used in order to stain these nucleic acids included in a sample under study. The sample is then irradiated with a wavelength of light specific to the stained nucleic acid in order to produce a fluorescence which then is scanned using the fluorescence quenching or enhancement techniques according to the invention. In this manner, it is possible to determine the locations of certain nucleic acid chains within a strand of DNA. These embodiments are also shown in FIGS. 3 and 4. The probe tip is scanned in close proximity to the DNA, or vice-versa. Each of the A, T, G and C DNA molecules is tagged with a different color fluorophore and then by looking at the light intensity output versus position of the probe over the sample, red, green, blue and ultraviolet output channels can be used to map the locations of the different A, T, G, and C molecules of a particular DNA strand. Such output mapping can be performed for either fluorescence quenching or fluorescence enhancement.

Examples of fluorescent dyes used in biological staining include Lucifer yellow and Texas red. Fluorescently tagged antibodies or other proteins are attached to the outside of a cell, and a cantilevered near-field optical probe is used to scan the cell and determine the location, intensity and color (frequency spectrum) of the attached fluorescent dyes. It is also possible to filter the incoming and outgoing light so as to only excite or observe one particular type of label at a time. In this manner, a cell is labelled with several different dyes which bind to different locations of the cell and the relative distances, orientations and movements between the different dyes are detected. These embodiments are also illustrated in FIGS. 3 and 4. Also, since the brightness and often color of a dye changes with pH, temperature, amount of dissolved ions such as, for example, calcium ions, the variations in these environmental conditions across the surface of a cell are determined by the variations in brightness and color of the dyes on the cell surface measured by a cantilevered near-field optical probe.

Fluorescence quenching or enhancement effects also occur in situations where a fluorophore contained in a sample is chemically excited. The chemical providing the energy to stimulate the fluorophore is typically added to the solution surrounding the fluorophore and the chemical diffuses through the solution into contact with the fluorophore and excites it. When the tip is close to a fluorophore it may block the interaction of the chemical with the fluorophore. The probability that the fluorophore will be excited by the chemical when the chemical comes into contact with the fluorophore changes when the presence of the tip catalyzes the excitation of the fluorophore by the chemical, and in this case increased fluorescence will be observed near the tip. Conversely, if the presence of the tip inhibits the excitation of the fluorophore by the chemical, decreased fluorescence will be observed. These effects are very noticeable because most fluorophores are naturally very dependent upon the local pH and ionic strength of the solution, both of which change rapidly near most surfaces. Local chemistry effects between the optically active element and the fluorophores being used determine the amount of quenching which will occur. For a discussion on such effects, see Schulman, "Fluorescence and Phosphorescence Spectroscopy: Physiochemical Principles and Practice" Pergamon Press, pp. 65–67, 1970, and Birks, "Photophysics of Aromatic Molecules" Wiley-Interscience, 1970. Quenching occurs when the surface chemistry of the tip changes the absorption spectrum of the fluorophore such that the excitation light no longer stimulates fluorescence. Quenching will also occur when the surface chemistry of the tip prevents emission of light by blocking transfer of excitation energy to the charge center on the fluorophore which emits fluorescence. Additionally, quenching of the fluorescence will occur when the surface chemistry of the tip provides a chemical nonradiative decay pathway for a fluorophore which it is in contact with.

Enhancement occurs when the surface chemistry of the optically active element is such that the absorption spectrum of the fluorophore will be stimulated by the excitation light. Enhancement of the fluorescence also occurs when the optically active element functions as a catalyst, for example, by forming a transient chemical complex with the fluorophore. In this case, neither the optically active element nor the fluorophore is chemically changed permanently. The interaction between the optically active element and the fluorophore serves to enhance the quantum yield or fluorescence excitability of the fluorophore. This phenomenon is referred to as columinescence, co-fluorescence, enhanced luminescence, or sensitized luminescence.

As another embodiment of the invention, similar to the embodiments shown in FIGS. 2 and 3, the mere physical presence of the optically active element at the tip in close proximity to the sample will change the local reflectivity, absorption or transmissivity of the sample due to changes in the intermolecular forces such as, for example, van der Waals forces, both attractive and repulsive, between the optically active element and the sample. The optically active element 13 is selected so as to have a surface chemistry which will produce the desired strong van der Waals forces. Good optically active elements include oxides (such as alumina ($Al_2O_3$), iron oxide ($Fe_3O_4$), zirconia (n-$ZrO_2$), rutile ($TiO_2$)), silicon carbide, and especially conductive metals such as silver, gold and copper. All of these materials have large Hamaker constants and hence produce strong van der Waals forces. For a discussion on van der Waals forces, see, for example, Israelachvili, "Intermolecular And Surface Forces", Academic Press, 2nd edition, San Diego, Calif., (1992) pp. 186–187 and p. 190–191. The van der Waals forces occur as a result of disturbances in the energy states of both the optically active element and the sample. Because of this phenomenon, non-fluorescent samples are imaged by determining changes in reflectivity, absorption or transmissivity caused by the close proximity of the optically active element provided at the cantilever tip. In this embodiment, the properties being measured are the optical properties of the sample and the susceptibility of these optical properties to change due to the proximity of the optically active tip in relation to the sample. For example, the absorption spectrum of the sample in isolation is dependent upon by the internal distribution of the fluctuating permanent and induced dipole moments of its constituent atoms interacting with each other in equilibrium. When the optically active tip is in proximity to a region of the sample, the distribution of the fluctuating permanent and induced dipole moments changes in both the region of the sample and the tip primarily by the exchange of virtual optical and ultraviolet photons which tend to align or correlate with fluctuating dipoles of the tip and sample region, lowering their internal energies. The exchange of virtual photons lowers their internal energies in correspondence with decreasing tip-sample distance which results in a stronger van der Waals force between the tip and the sample. In fact, knowing the optical properties of two materials allows accurate calculation of the van der Waals forces between two objects of known shape, size and separation. When the optically active tip is near a region of the surface, a new equilibrium distribution of fluctuating dipoles is produced in the region of the surface which will have a different optical absorption spectrum, a different transmissivity and a different reflectivity. All of these properties vary somewhat with orientation of the sample relative to the optical axis of excitation and/or observation. The orientation dependence of these properties will also be changed by the changed distribution of fluctuating dipoles in the sample region near the optically active tip.

Figure 5A:
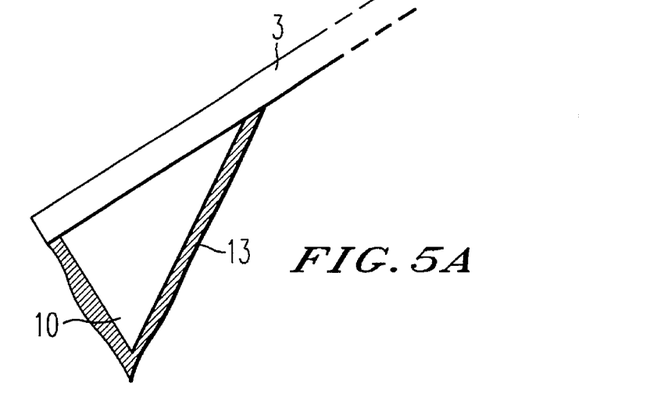
FIG. 5(a) illustrates an enlarged view of a cantilever with a tip portion coated with an optically active element.

FIG. 5(a) shows an enlarged view of a tip portion 10 of a flexible cantilever 3, in which an optically active material 13 is coated on the external walls of the tip portion 10, including the apex portion thereof. In the case where the tip is coated with conductive material, the apex of the tip must be sharp enough up so as to have a width which is less than the wavelength of light which is being used to irradiate the sample. This is done by depositing hard metals such as iridium or platinum, for example, or soft metals such as silver or copper. The advantage of using hard metals is that they are more resistant to abrasion by the sample. It is preferable to have only a small amount of metal at the very end of the tip, i.e., the apex portion thereof so as to achieve a well-defined high resolution. In other words, the metal formed over the cantilever tip which is to be in close proximity to the sample within a distance of, for example, one wavelength of light, should be less than one wavelength of light in diameter to achieve resolutions on that order of magnitude.

Figure 5B:
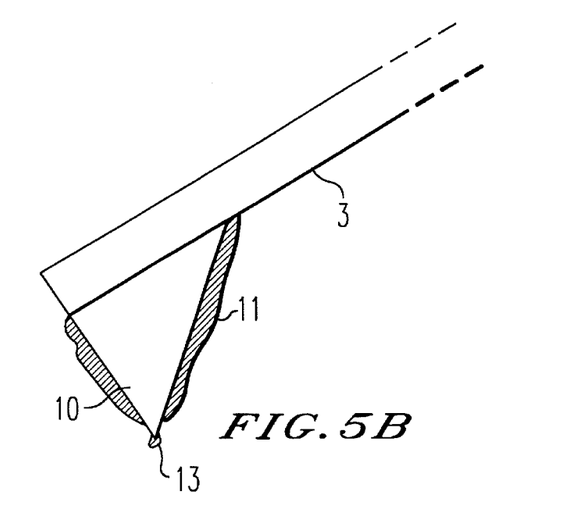
FIG. 5(b) illustrates an enlarged view of the transparent tip having a conductive element disposed at an apex portion thereof.

Alternatively, as shown in FIG. 5(b), the tip portion 10 is coated with an opaque material on the walls thereof except at the apex portion where a small optically active element 13 is disposed thereby to create a small optical opening at the apex portion of the tip left free of any opaque material. The opaque material 11 in FIG. 5(b) may be the same as the optically active material 13, i.e., a metal such as gold or silver, for example. However, such is not required because the opaque material will generally not be in close enough proximity to cause modifications in the optical properties of the sample. The optically active material will preferably be chosen to have the maximum effect on the optical properties and durability of the sample (such as, for example, tungsten, silicon carbide, rutile) while the opaque material will be chosen for optimum transmissivity at the wavelength of interest of the light through the tip (such as, for example, aluminum).

Figure 5C:
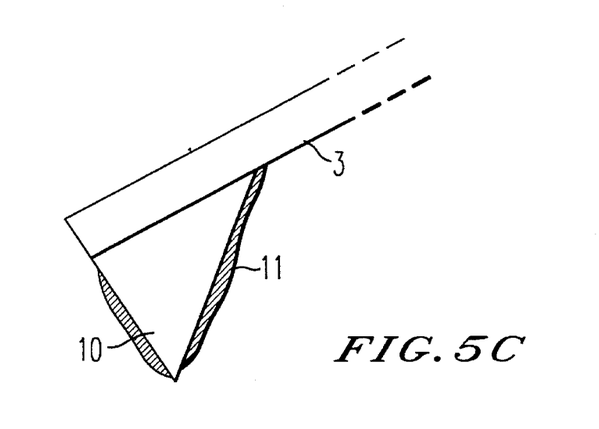
FIG. 5(c) illustrates an enlarged view of the transparent tip having an opaque material coated around the external walls of the cantilever tip in order to produce a point source of light having a cross-sectional diameter equal to the diameter of the apex portion of the tip not coated with the opaque material.

FIG. 5(c) shows a variation on the embodiment of FIG. 5(b) in which the optically active element is the material of the tip itself, i.e., typically silicon oxide, silicon nitride or pure silicon. In this case, electromagnetic energy below the band gap of the material passes through the aperture formed at the apex of the probe tip 10. This allows visible light in the case of silicon oxide and silicon nitride and infrared light in the case of silicon to illuminate a small area of the sample beneath the probe tip 10 while the opaque material 11 prevents illumination of other areas of the sample.

With the probe of FIG. 5(b), the optically active element will range in size from a few nanometers (a single molecule for example) up to 200 nanometers in diameter. The material is a metallic particle (gold, silver, tungsten), an oxide (rutile, alumina), or silicon carbide, for example. The cantilever probes themselves typically range in size from a few microns up to hundreds of microns in length and from tens to hundreds of nanometers in thickness.

The probes shown in FIGS. 5(a)–5(c) are made by evaporating, sputtering, or spraying the optically active or opaque materials onto the tip. Alternatively, these materials are deposited chemically from a liquid solution or from a vapor or gasified source such as in chemical vapor deposition or molecular beam epitaxy. In FIGS. 5(b) and 5(c), the transparent aperture is formed by covering the apex while the opaque material is being deposited using a protective covering which is removed after the opaque material is deposited. Alternatively, the opaque material is deposited in such a manner so as to avoid coating the apex, for example, by evaporating material onto the tip from the sides. As a further alternative, the opaque material is removed chemically (etched) or physically (by abrasion) from the apex after deposition thereon. As a still further possibility, the particles of the optically active material are affixed to the apex with glue, epoxy, heat treatment or other bonding techniques.

In a preferred embodiment, a transparent inert material is coated over the apex of the tip which spaces the enclosed apex of the tip a small and constant vertical distance away from the sample while the cantilever presses the transparent inert material coated tip against the surface. Even when the cantilever is not pressing the tip against the surface, tip-sample adhesion will maintain the tip in contact with the surface until the pull-off force applied by the cantilever exceeds the adhesion force. It may also be desirable to operate in fluids which decrease the tip-sample adhesion, thereby allowing smoother lateral scanning while in contact with the surface.

In order to maintain constant force between the probe tip and the sample surface, it is also possible to use the feedback control techniques associated with atomic force microscopes (AFM's). In this manner, the optical microscopy is performed simultaneously with the production of AFM images. Typical AFM techniques include sensing the deflection of the cantilever by reflecting a light beam from the cantilever and analyzing the deflection of the cantilever by, for example, using a split detector to detect light reflected off the cantilever, detecting the change in resistance of a piezoresistive element provided on or integrated into the cantilever, or by using interferometry techniques. Therefore, if deflection of the cantilever is detected using AFM technology, it is possible to obtain an image of topography simultaneously with a near-field optical image obtained as described above.

Figure 6:
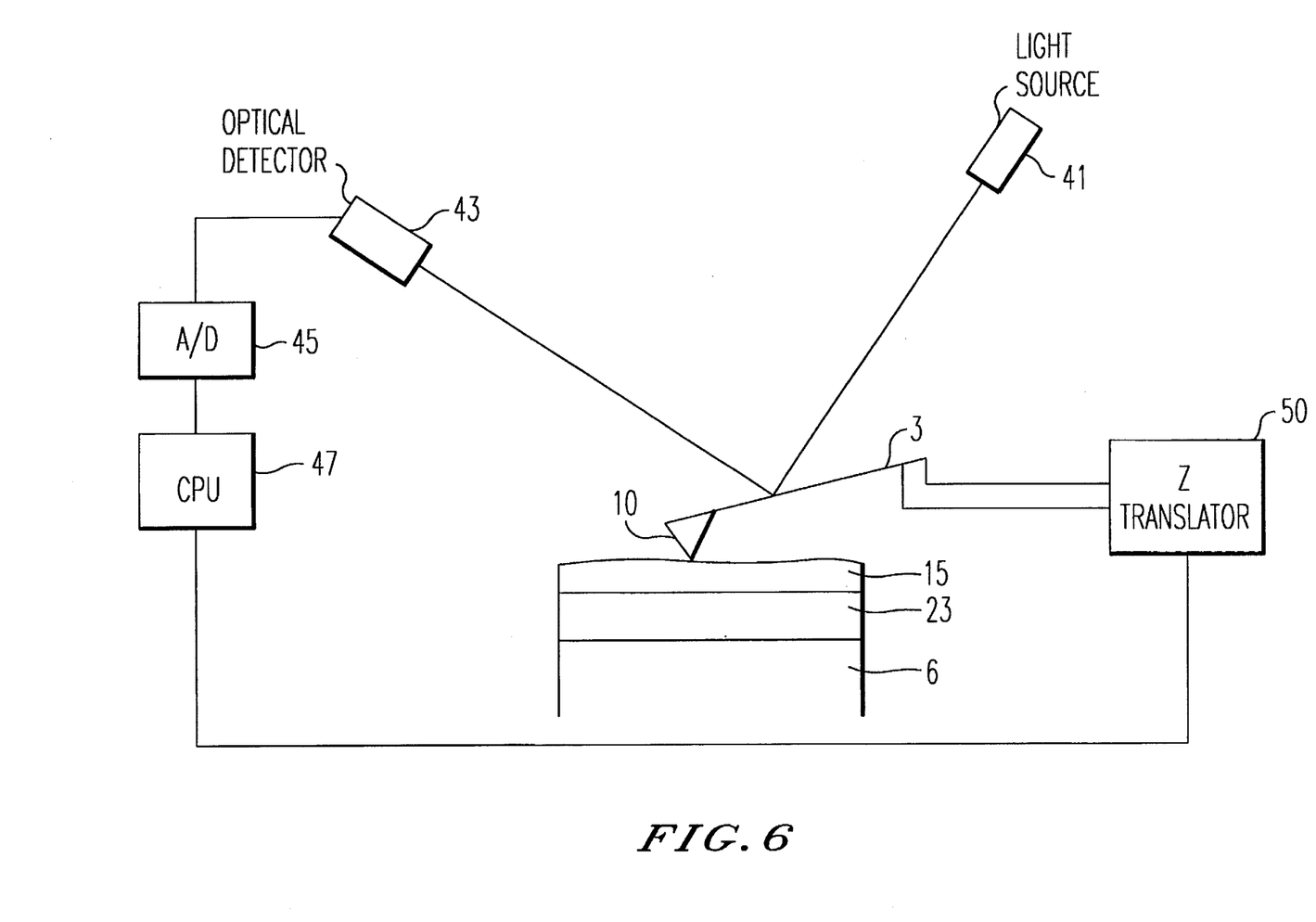
FIG. 6 illustrates a feedback control system associated with AFM techniques which is used for controlling the cantilever tip in near-field microscopy according to the invention.

FIG. 6 illustrates the use of AFM control which uses feedback techniques for maintaining the force between the probe tip and the surface of sample 15 constant. As shown, a Z translator 50 is provided for monitoring the contact force between the probe tip and the sample surface so as to raise or lower the cantilever and thereby maintain a constant contact force between the sample and the probe tip 10. A light source 41 is provided for reflecting a light beam from the cantilever 3 and a detector 43 is used for receiving the reflected light. The output from detector 43 is input to an A/D converter 45 and the digital signal is applied to a microprocessor 47 which generates the necessary amount of vertical movement, i.e., the z direction movement, which the cantilever should be moved to maintain the force constant. There are several different ways of performing AFM control, including oscillation of the probe tip in the z direction, such as disclosed in U.S. Pat. Nos. 5,237,859; 34,331 and 5,412, 980, the teachings of which are incorporated herein by reference. In this manner, high resolution images of the sample topography otherwise obtained by the AFM are used to complement the near-field optical images. While the AFM technique will obtain higher resolution in general, it will not provide any spectroscopy information such as, for example, the color of the sample or whether the sample is fluorescing, information which can be obtained using the near-field optical microscopy techniques of the present invention. In this manner, high resolution topographic scans are obtained using the AFM techniques while at the same time minimizing damage to the sample by controlling the force of the cantilever while it is near or in contact with the surface of the sample.

Figure 7:
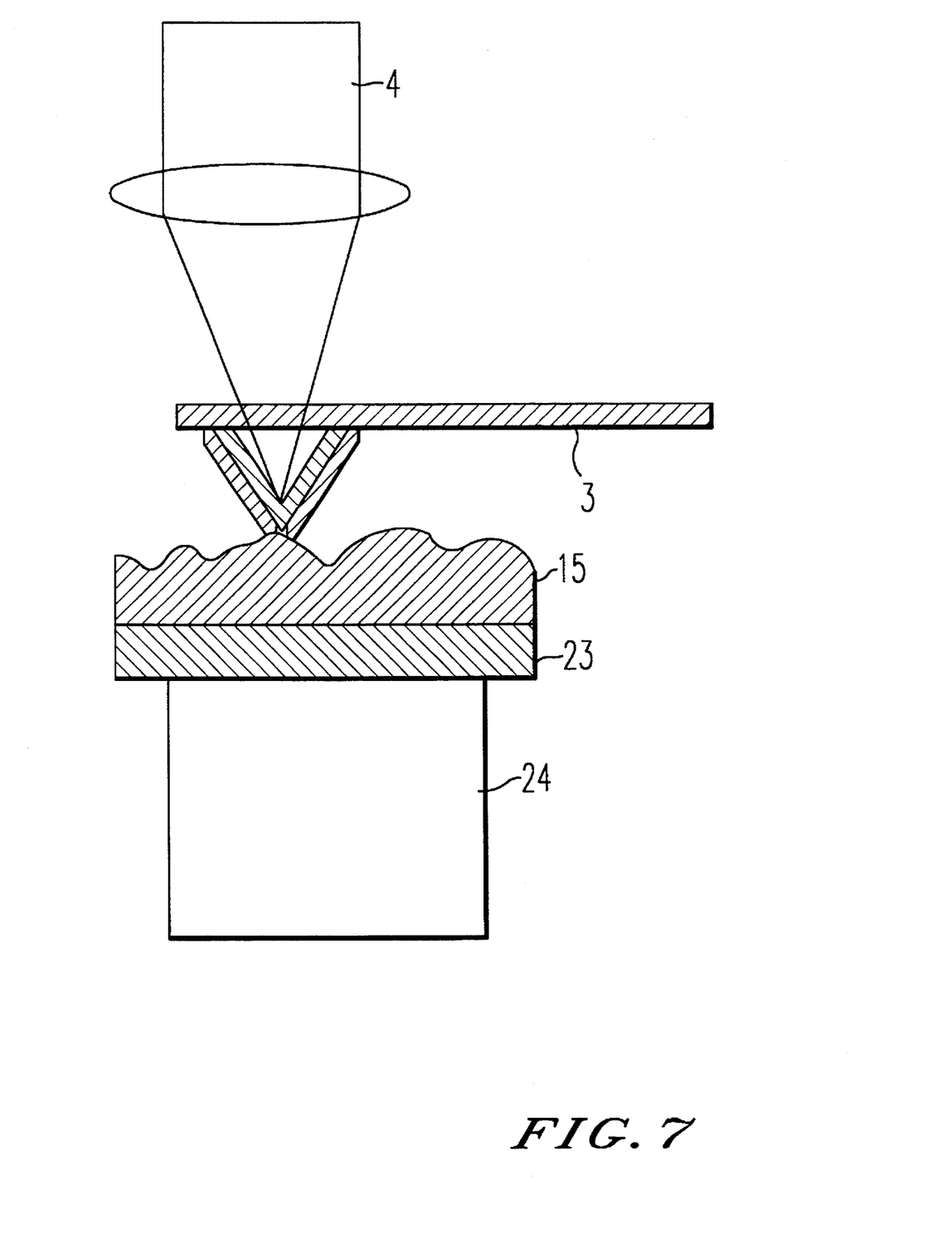
FIG. 7 illustrates a schematic diagram of the scanning near-field optical microscope according to the present invention shown in combination with a detector and piezoelectric translation tube for moving the sample relative to the cantilever probe.

As described above, a combination of a scanning near-field and an atomic force microscope using the same unmodified tip for both signals, i.e., the AFM signal and the near-field scanning signal, has been described in detail. The tips can be used as light sources by irradiating a laser beam onto the back portion of the tip and then viewing the back-reflected light. The probe tips are coated with a thin aluminum film, for example, from the side in order to create a small light transmitting aperture at the apex. This product allows the modified tips to function as near-field light sources. Fluorescent light or polarized light can also be detected using these tips (by adding filters to the light source and detector). For the initial images, the transmitted light was monitored and the optical lever deflection system was omitted in order to minimize the coupling of topography in the optical image. An optical microscope (Zeiss Axioskop) was modified so that a laser beam (with a wavelength, for example, equal to 632 nm) could be coupled to it and focused by the objective lens (Zeiss Fluorplan 40x, N.A. 0.65) onto the cantilever as shown in FIG. 7. The cantilever having the integrated tip was mounted on a holder device fixed to the object stage of the microscope. Prior to use, each tip was coated with a thin (20 nm) aluminum layer such that only the sides of the tip were covered. An even coating was achieved by rotating the tip and the sample was directly attached to a planer Si-photodetector (PIN spot 1D, United Detector Technologies), which was fixed magnetically onto a piezo tube scanner (a modified AFM D-scanner Digital Instruments, Santa Barbara, Calif.). This scanner was mounted on the holder of the condenser lens of the microscope, after the condenser itself had been removed. Using this holder the distance between the tip and sample could be adjusted. Data collection and a generation of the scanning voltages for the piezo tube was performed using commercial scanning probe electronics (Nanoscope II, Digitial Instruments, Santa Barbara, Calif.).

Figure 8A:
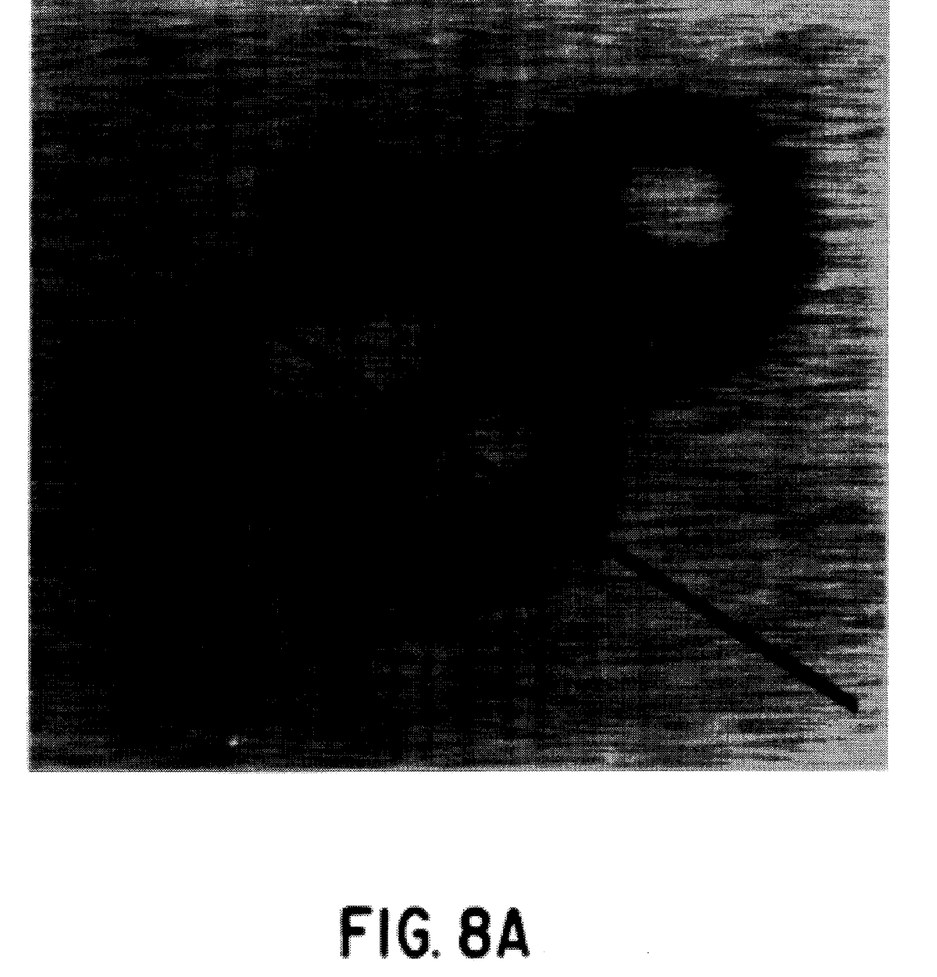
FIG. 8(a) illustrates a near-field image obtained using the apparatus of the present invention.
Figure 8B:
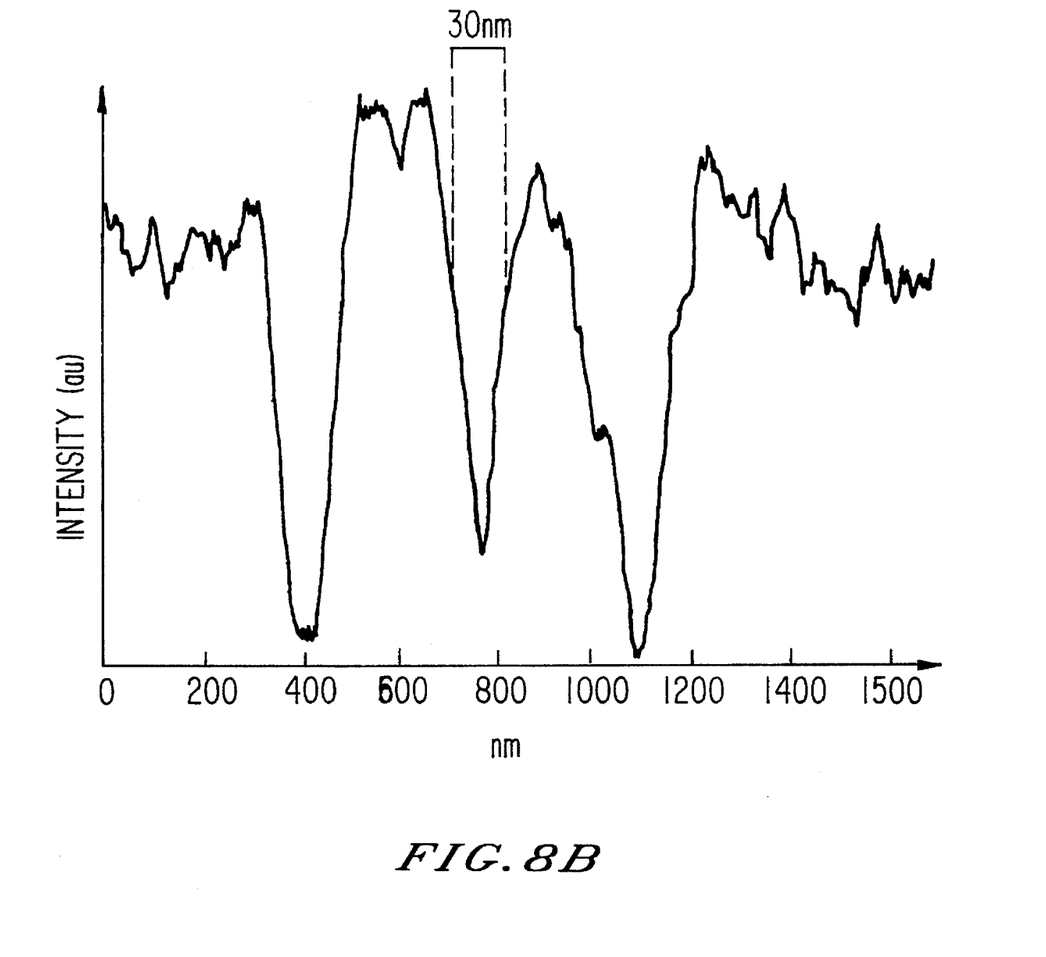
FIG. 8(b) illustrates a graph showing results of analysis of the near-field image shown in FIG. 8(a).

Latex beads in an aqueous suspension (450 nm nominal radius, Sigma, St. Louis, Mo.) were diluted 1:100 in pure water and adsorbed onto glass microscope slides. After air drying these slides were coated with a partially transparent film (20 nm of chromium). The chromium film adhered to the glass everywhere except where the glass was shadowed by the latex beads. In a final step, the latex beads were removed by short ultrasonication and water (exposing small regions of bare glass again). These samples showed high optical contrast, but very low topographic features. FIG. 8(a) demonstrates a near-field optical image of holes in the chromium film on glass. The features are clearly visible which could not be resolved by the objective lens using light with a wavelength of 632 nm. The optical resolution, given by $1.22^* \text{Lamda/N.A.}$, is 1.3 microns in this context. A profile plot shown in FIG. 8(b) along the black line illustrated in FIG. 8(a) demonstrates that the non-transparent circular features have a width of approximately 160 nanometers. The four width at half maximum is about 80 nanometers. The image was stable and reproducible, and did not depend upon the scan rate over a wide range (for example, from 4.3 up to 40 lines per second), and independent of scan direction. Thus, it is highly unlikely that the image is caused by some AFM-like process such as bending of the cantilever due to height or friction.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. A microscope for performing near-field optical microscopy on a sample, comprising:

means for stimulating fluorescence in a region of the sample;

a probe including an optically active element;

means for moving one of said probe and said sample with respect to the other while said optically active element is in close proximity to a portion of said region of said sample so that a change in the amount of fluorescence of said portion occurs if said portion is fluorescing; and means for detecting the change in the amount of fluorescence emitted from said portion of said sample while said optically active element is in close proximity to said portion.

2. The microscope according to claim 1, wherein said means for moving comprises:

means for producing a relative lateral scanning motion between said probe and said sample to obtain an image related to changes in the amount of fluorescence emitted by different portions of a plurality of regions of said sample.

3. The microscope according to claim 1, further comprising:

means for oscillating one of said probe and said sample with respect to the other at a given frequency while said optically active element is in close proximity to a portion of said region of said sample so that a change in the amount of fluorescence of said portion occurs at said given frequency if said portion is fluorescing; and said means for detecting includes means for detecting the change in the amount of fluorescence emitted from said portion of said sample at said given frequency.

4. The microscope according to claim 1, wherein said probe comprises a cantilever having a tip portion which includes said optically active element.

5. The microscope according to claim 4, wherein said tip portion is transparent and has walls which are coated with an opaque material except at an apex portion thereof so as to provide a transparent aperture.

6. The microscope according to claim 5, wherein said means for stimulating fluorescence in said region of said sample comprises means for projecting a beam of light through said aperture of said transparent tip to irradiate a region of said sample with said beam of light so as to stimulate fluorescence in said irradiated region.

7. The microscope according to claim 1, wherein said moving means comprises:

control means for maintaining a substantially constant force between said sample and said probe and for producing a signal indicative of the surface topography of said sample.

8. A microscope for performing near-field optical microscopy on a sample, comprising:

means for irradiating a region of the sample with optical energy;

a cantilevered probe having a tip portion which includes an optically active element;

means for moving one of said probe and said sample with respect to the other while said optically active element is in close proximity to a portion of said region of said sample so that a change in one or more optical properties of said portion of said region occurs; and means for detecting the change in said one or more optical properties of said portion while said optically active element is in close proximity to said portion.

9. The microscope according to claim 8, wherein said moving means comprises:

means for producing a relative lateral scanning motion between said probe and said sample.

10. The microscope according to claim 8, further comprising means for oscillating one of said probe and said sample with respect to the other at a given frequency while said optically active element is in close proximity to said portion of said region so that a change in said one or more optical properties of said portion occurs; and said means for detecting includes means for detecting the change in said one or more optical properties of said portion at said given frequency.

11. The microscope according to claim 10, wherein said tip portion is transparent and has walls coated with an opaque material except at an apex portion thereof so as to provide a transparent aperture.

12. The microscope according to claim 8, wherein said moving means comprises:

control means for maintaining a substantially constant force between said sample and said tip portion and for producing a signal indicative of the surface topography of said sample.

13. A method for generating an image of a sample, comprising the steps of:

stimulating fluorescence of a region of said sample;

moving one of an optically active element and said sample with respect to the other while said optically active element is in close proximity to a portion of said region of said sample so that a change in the amount of fluorescence of said portion occurs if said portion is fluorescing; and detecting the change in the amount of fluorescence of said portion while said optically active element is in close proximity to said portion.

14. The method according to claim 13, wherein said step of moving one of said optically active element and said sample with respect to the other comprises:

producing a relative lateral scanning motion between said optically active element and said sample.

15. The method according to claim 13, further comprising:

generating an oscillation motion at a predetermined frequency in the relative position between said optically active element and said sample.

16. The method according to claim 15, wherein said detecting step comprises:

measuring changes in the amount of fluorescence of said portion at said predetermined frequency of oscillation between said optically active element and said sample.

17. The method according to claim 15, wherein said step of moving comprises:

producing a relative scanning motion between said sample and said optically active element during said oscillation in the relative position between said sample and said optically active element.

18. The method according to claim 13, wherein said step of moving comprises:

maintaining a substantially constant force between said sample and said optically active element and producing a signal indicative of the surface topography of the sample.

19. A method for generating an image of a sample, comprising the steps of:

stimulating fluorescence in a region of said sample;

scanning a cantilevered probe across a surface of the sample, wherein said probe includes an optically active element;

moving one of said cantilevered probe and said sample with respect to the other while said optically active element is in close proximity to a portion of said region so that a change in one or more optical properties of said portion occurs; and detecting the change in said one or more optical properties of said portion of said region while said optically active element is in close proximity to said portion.

20. The method according to claim 19, further comprising:

oscillating one of said probe and said sample with respect to the other at a given frequency while said optically active element is in close proximity to a portion of said region of said sample so that the change in said one or more optical properties of said portion occurs; and said step of detecting comprises detecting the change in said one or more optical properties of said portion at said given oscillation frequency.

21. The method according to claim 19, further comprising:

producing a relative lateral scanning motion between said optically active element and said sample.

22. The method according to claim 19, wherein said step of moving comprises:

maintaining a substantially constant force between said sample and said probe and producing a signal indicative of the surface topography of the sample.

* * * * *